(12) United States Patent
Clark

(10) Patent No.: US 6,662,670 B2
(45) Date of Patent: Dec. 16, 2003

(54) SEATBELT FORCE SENSOR WITH OVERLOAD PROTECTION

(75) Inventor: Jeffrey Allen Clark, Sterling Heights, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/955,762

(22) Filed: Sep. 19, 2001

(65) Prior Publication Data

US 2002/0038573 A1 Apr. 4, 2002

Related U.S. Application Data

(60) Provisional application No. 60/237,257, filed on Oct. 2, 2000.

(51) Int. Cl.[7] .................................................. G01L 5/10
(52) U.S. Cl. .................................................. 73/862.391
(58) Field of Search ..................... 73/862.451, 862.453, 73/862.391, 862.42; 280/735

(56) References Cited

U.S. PATENT DOCUMENTS

| | | | | |
|---|---|---|---|---|
| 4,618,164 A | * | 10/1986 | Ryu ........................... 280/804 |
| 5,413,378 A | | 5/1995 | Steffens, Jr. |
| 5,431,447 A | | 7/1995 | Bauer |
| 5,454,591 A | | 10/1995 | Mazur |
| 5,566,978 A | | 10/1996 | Fleming |
| 5,626,359 A | | 5/1997 | Steffens, Jr. |
| 5,664,807 A | | 9/1997 | Bohmler |
| 5,906,393 A | | 5/1999 | Mazur |
| 5,960,523 A | * | 10/1999 | Husby et al. ................. 24/633 |
| 5,996,421 A | * | 12/1999 | Husby ................... 73/862.451 |
| 6,079,745 A | | 6/2000 | Wier |
| 6,081,759 A | | 6/2000 | Husby et al. |
| 6,179,330 B1 | | 1/2001 | Wier |
| 6,209,915 B1 | * | 4/2001 | Blakesley ................. 280/801.1 |
| 6,405,607 B2 | * | 6/2002 | Faigle et al. ........... 73/862.391 |
| 6,508,114 B2 | * | 1/2003 | Lawson ........................ 73/159 |
| 2001/0052696 A1 | * | 12/2001 | Curtis et al. ................. 280/735 |

FOREIGN PATENT DOCUMENTS

| | | |
|---|---|---|
| DE | 3817042 A1 | 12/1988 |
| EP | 656 283 B1 | 6/1995 |
| EP | 0 997 358 A2 | 5/2000 |
| WO | WO 98/17508 A1 | 4/1998 |

OTHER PUBLICATIONS

International Search Report, dated Apr. 19, 2002.

* cited by examiner

Primary Examiner—Max Noori

(57) ABSTRACT

A sensor assembly 40 for measuring seatbelt forces includes a first structural member 50 anchored to a vehicle structure and a second structural member 54 mounted for movement relative to the first structural member 50 in response to a seatbelt force (FIG. 2). A thin member 56 is mounted between the first 50 and second 54 structural members and provides a mounting surface for a sensor 58. The thin member 56 responds to movement of the second structural member 54 to provide high strain levels for the normal working range of the sensor 58. The thin member 56 is mounted between the first 50 and second 54 structural members such that the sensor 58 is isolated from movements due to non-axial loads. The first 50 and second 54 structural members are inter-related to define a maximum range of movement between the first 50 and second 54 members. Thus, overload protection is provided to prevent separation of the first 50 and second 54 structural members when a predetermined load limit is exceeded.

24 Claims, 2 Drawing Sheets

SEATBELT FORCE SENSOR WITH OVERLOAD PROTECTION

RELATED APPLICATION

This application claims priority to provisional application 60/237,257 filed on Oct. 2, 2000.

BACKGROUND OF THE INVENTION

1. Field of the Invention

This invention relates to a method and apparatus for measuring the force applied to a seatbelt. Specifically, a belt force sensor is mounted on a plate positioned between a fixed mounting member and a movable mounting member to isolate the sensor from movements due to non-axial loads.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is an infant seat or small adult/child secured to the vehicle seat then the airbag should not be deployed or should be deployed at a significantly lower deployment force. One way to control the airbag deployment is to monitor the weight of the seat occupant.

Current systems for measuring the weight of a seat occupant are complex and expensive. One type of system uses pressure sensitive foil mats mounted within the seat bottom foam. Another system uses sensors placed at a plurality of locations within the seat bottom. The combined output from the mats or the sensors is used to determine the weight of the seat occupant. The accuracy of the weight measurements from these types of sensor systems can be compromised due to additional seat forces resulting from the occupant being secured to the seat with a seatbelt.

For example, weight sensor systems can have difficulty identifying an adult, a child, or a car seat when the seatbelt is being used. When a child seat is secured to a seat with a seatbelt, an excess force acts on the sensors mounted within the rear portion of the seat bottom, which interferes with accurate weight sensing. Over tightening of the seatbelt to securely hold the child seat in place, pulls the child seat down against the rear part of the seat bottom, causing the excessive force measured by the sensors. Due to this effect, the current weight sensing systems have difficulty in discerning between an adult belted to a seat and a child seat secured to the seat with a seatbelt.

In order to address this problem, sensors have been incorporated into the seatbelt to measure the tension force applied to the seatbelt as passengers or a child seat is secured to the seat. High seatbelt tension forces indicate that a child seat is secured to the seat. One current belt force sensor is mounted to a metal plate anchored at one end to a vehicle structure and mounted at an opposite end to a seatbelt latching member. The sensor measures the strain applied to the plate to determine the tension force on the seatbelt. One disadvantage with this system is that it is difficult to get accurate strain measurements for the lower operating ranges. The metal plate, as a direct connecting member between the seatbelt latching portion and the vehicle structure, must be thick enough to withstand overloading on the seatbelt caused by high vehicle impact/collision forces. However, because the metal plate is so thick, there is not enough strain movement of the plate at the normal operating ranges of the sensor to accurately measure seatbelt tension.

Another disadvantage with this type of sensor configuration is that non-axial loading on the metal plate can affect the accuracy of the tension force measurement. Preferably, as the seatbelt is tightened, a linear or axial force is applied to one end of the metal plate and the sensor measures the strain caused by this axial loading. However, if a non-axial load is applied to the plate by pulling on one end of the metal plate at an angle, the sensor may provide an inaccurate reading.

Thus, it is desirable to have a system for measuring seatbelt forces to determine whether a child seat or an adult is secured to the seat that utilizes a sensor that is isolated from non-axial movements, and which can provide a high strain level for the normal working range of the sensor. The system should also work with traditional seat occupant weight sensing systems, provide increased accuracy, be easy to install, as well as overcoming any other of the above referenced deficiencies with prior art systems.

SUMMARY OF THE INVENTION

A seatbelt sensor system includes a sensor that is mounted to a floating or isolated member positioned between a fixed member and a movable member. The fixed member is preferably mounted to a vehicle structure and the movable member is mounted for movement relative to the fixed member in response to a seatbelt input force. The floating member is preferably a thin resilient member that responds to movement of the movable member to provide high strain levels for a normal working range of the sensor. An overload stop prevents the separation of the movable member from the fixed member when a predetermined seatbelt input force limit is exceeded.

In a disclosed embodiment of this invention, the fixed member and the movable member are significantly thicker than the resilient member that supports the sensor. The movable and fixed members work together to define the overload stop. The fixed member includes a transversely extending portion that extends through the resilient member and the movable member in a first direction. The movable member includes a transversely extending portion that extends through the resilient member and the fixed member in a second direction, opposite from the first direction. The openings in the fixed and movable members through which the transversely extending portions extend are greater in size than the openings in the resilient member through which the transversely extending portions extend. This allows the movable member to provide input to the resilient member while also providing an overload stop between the fixed and movable members.

A method for measuring seatbelt forces includes the following steps. One structural member is fixed to a vehicle structure. Another structural member is mounted for movement relative to the first member in response to a seatbelt input force. Another member, which supports a sensor, is positioned between the first and second structural members. A seatbelt force, applied to this middle member by the moving structural member, is measured by the sensor. Further, separation of the moving structural member from the fixed member is prevented if a predetermined seatbelt force limit is exceeded.

These and other features of the present invention can be best understood from the following specification and drawings, the following of which is a brief description.

DETAILED DESCRIPTION OF AN EXEMPLARY EMBODIMENT

Figure 1:
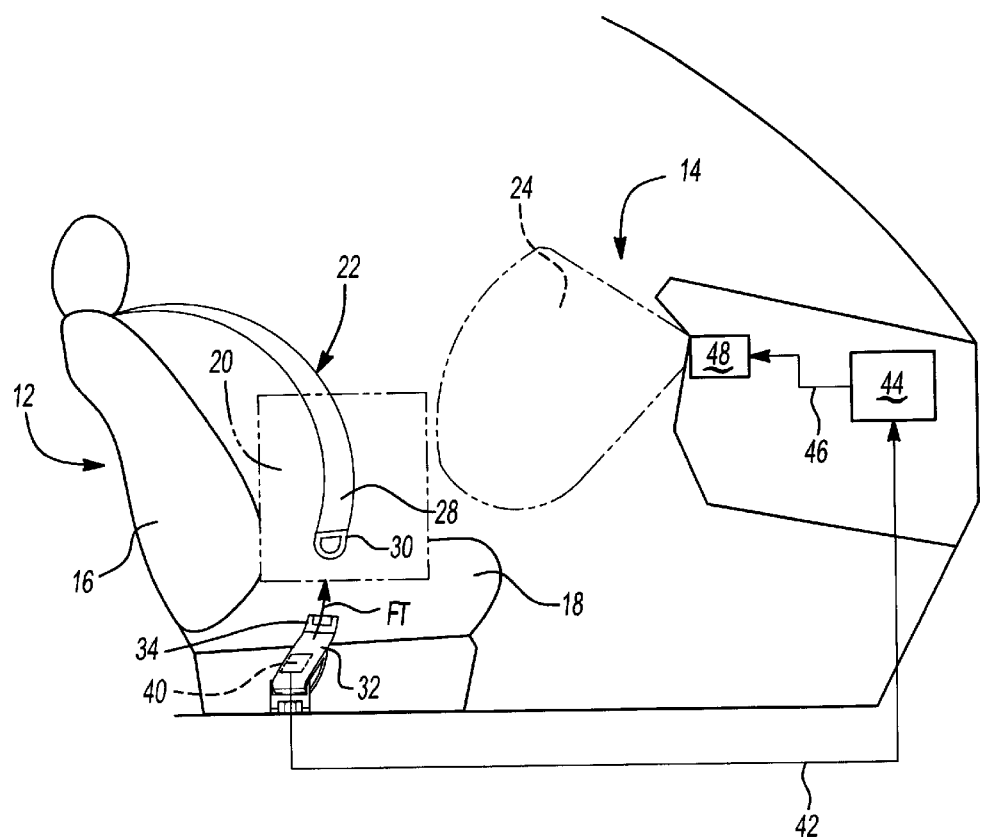
FIG. 1 is a schematic view showing a seat in a vehicle with an airbag system and seatbelt assembly incorporating the subject invention.

A vehicle includes a vehicle seat assembly, shown generally at 12 in FIG. 1, and an airbag system 14. The seat assembly 12 includes a seat back 16 and a seat bottom 18. A vehicle occupant (adult, child, car seat) 20 is secured to the seat 12 with a seatbelt 22. A tension force $F_T$ is exerted on the seatbelt 22. The tension force $F_T$ represents the force that is exerted against the occupant as the belt is tightened.

The airbag system 14 deploys an airbag 24 under certain collision conditions. The deployment force for the airbag 24, shown as deployed in dashed lines in FIG. 1, varies depending upon the type of occupant 20 that is belted to the seat 12. When an adult is belted to the vehicle seat 12, the airbag 24 should be deployed in a normal manner. If there is an infant or child seat secured to the vehicle seat 12 then the airbag 24 should not be deployed. Thus, it is important to be able to accurately identify the type of occupant 20 that is belted to the seat 12. One way to determine this is by monitoring the tension exerted on the seatbelt 22. When an adult is belted to the seat, normal seatbelt forces are exerted against the seatbelt 22. When an infant or child seat is belted to the seat 12, high tension forces are exerted on the seatbelt 22 because the seatbelt 22 is overtightened to securely hold the child seat in place.

The seatbelt 22 has a strap portion 28 that includes a shoulder harness and/or lap belt that is connected to a male buckle member 30. A seatbelt latch mechanism 32 is hard mounted to the seat 12 or other vehicle structure and typically extends outwardly from the seat 12 between the seat back 16 and the seat bottom 18. The latch mechanism 32 includes a female receptacle 34 that receives the male buckle member 30 to secure the occupant 20 or child seat to the seat 12. The strap portion 28 can be manually or automatically tightened to a desired tension once the belt is buckled.

A sensor assembly 40 for measuring the tension forces in the seatbelt 22 is incorporated into the seatbelt latch mechanism 32. The sensor assembly 40 generates a signal 42 representative of the tension force $F_T$ of the seatbelt 22. This signal 42 is sent to a central processor unit (CPU) 44 or other similar device that utilizes the belt force and occupant weight information to identify the type of occupant positioned on the seat. A control signal 46 is then sent to an airbag control 48 to deploy or not deploy the airbag 24.

Figure 2:
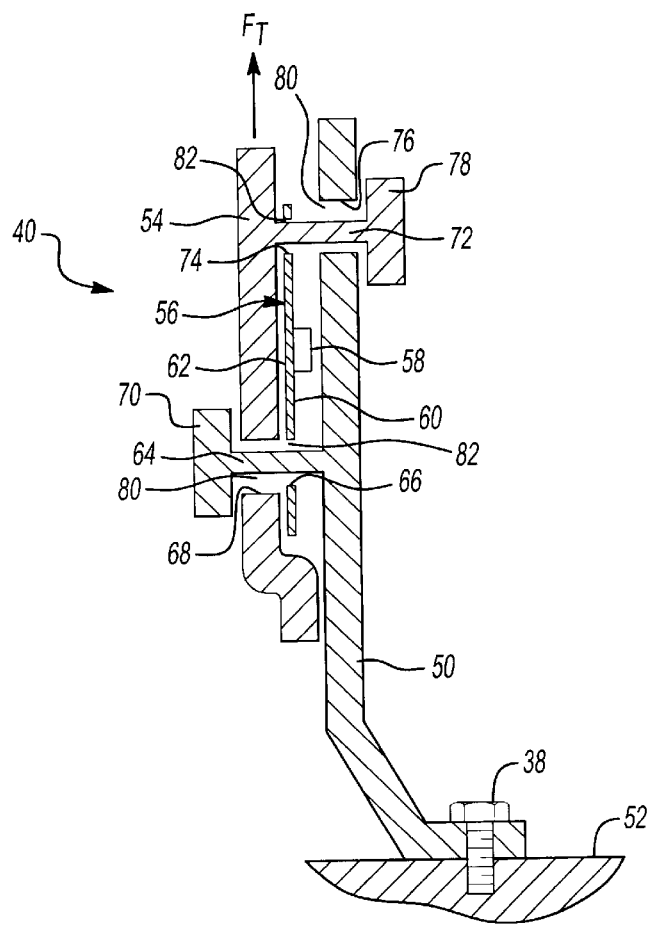
FIG. 2 is a cross-sectional side view of the subject sensor assembly.

The sensor assembly 40 is shown in greater detail in FIG. 2. The sensor assembly 40 includes a first structural member 50 that is fixed relative to a vehicle structure 52 and a second structural member 54 that is mounted for movement relative to the first structural member 50. The second structural member 54 is preferably mounted to the snap or latching mechanism 32 of the seatbelt 22. A thin third member 56 is positioned between the first 50 and second 54 structural members and supports a sensor 58. The third member 56 is mounted as a separate member from the first 50 and second 54 structural members, i.e., there is no direct attachment between either the third member 56 and the first structural member 50 or the third member 56 and the second structural member 54. Thus, the third member 56 can float or move relative to both the first 50 and second 54 structural members. This mounting configuration isolates the sensor 58 from movements due to non-axial loads.

A seatbelt input load or force $F_T$ is exerted against the movable structural member 54, which in turn exerts the force $F_T$ to the thin third member 56. Preferably, the force $F_T$ is applied linearly or axially to the second structural member 54, however the force $F_T$ can sometimes include non-axial loading force components. As discussed above, the subject sensor assembly 40 is designed to isolate the sensor 58 from movements due to non-axial loading. The sensor 58 measures the movement of the third member 56 resulting from axial forces to determine the tension force in the seatbelt 22.

In the preferred embodiment, the third member 56 has a thickness that is significantly less than the thicknesses of the first 50 and second 54 structural members. The sensor 58 is preferably a strain gage that measures the strain caused by the flexing or stretching of the third member 56 due to the seatbelt force. The third member 56 is preferably a resilient spring element made from a stainless steel material that has the ability to return to a zero or home position once the seatbelt force has been removed. Thus, the third member 56 can be repeatedly stretched and returned to the zero position to provide a high strain level throughout the normal working range of the strain gage.

Preferably, the third member 56 is formed from a stainless steel such as SS 17-7, SS 14-4, or SS 15-5, for example, however, other similar materials known in the art could also be used. Further, the strain gage can be either a full or half bridge strain gage and can be positioned at various locations on the third member 56. For example, the strain gage can be placed on either a top mounting surface 60 or bottom mounting surface 62 of the third member 56.

The first 50 and second 52 structural members are preferably formed from standard sheet metal but can be formed from other similar materials. As discussed above, the first structural member 50 is fixed relative to the vehicle structure 52. The vehicle structure 52 can be a seat anchor, B-pillar, vehicle floor, or can be part of the seat 12 or seat mounting structures. Further, the first structural member 50 can be directly mounted to the vehicle structure 52 with at least one fastener 38, as shown in FIG. 2, or can be mounted to the vehicle structure 52 with a bracket or other mounting member (not shown).

The first structural member 50 includes a transversely extending portion 64 that extends through an opening 66 in the third member 56 and an opening 68 in the second structural member 54. The transversely extending portion 64 includes a head 70, larger in diameter than the opening 68 of the second structural member 54 that prevents separation of the first 50 and second 54 structural members due to horizontal forces.

The second structural member 54 includes a transversely extending portion 72 that extends through an opening 74 in the third member 56 and an opening 76 in the first structural member 50. The transversely extending portion 72 includes a head 78, larger in diameter than the opening 76 of the first structural member 50 that prevents separation of the first 50 and second 54 structural members due to horizontal forces. The transversely extending portion 72 of the second structural member 54 extends in an opposing direction from the transversely extending portion 64 of the first structural member 50.

The first 50 and second 54 structural members are interrelated to define an overload stop. The overload stop prevents separation of the second structural member 54 from the first structural member 50 due to high collision/impact forces. The openings 76, 68 in the first 50 and second 54 structural members are larger than the openings 66, 74 in the third member 56. Thus, larger gaps 80 are formed between the transversely extending portions 72, 64 and the first 50 and second 54 structural members, respectively, as compared to gaps 82 formed between the transversely extending portions 72, 64 and the third member 56. Preferably, the gaps 82 in the third member 56 are in the range of 0.3–0.5 millimeters while the gaps 80 in the first 50 and second 54 structural members are in the range of 7–8 millimeters. While these are the preferred ranges, it should be understood that other ranges could also be used.

The larger gaps 80 define the range of movement of the second structural member 54 relative to the first structural member 50. This configuration allows the third member 56 to respond to movements of the second structural member 54 to provide high strain levels in the normal working range of the sensor 58 but provides an overload stop that prevents separation due to high impact forces.

Figure 3:
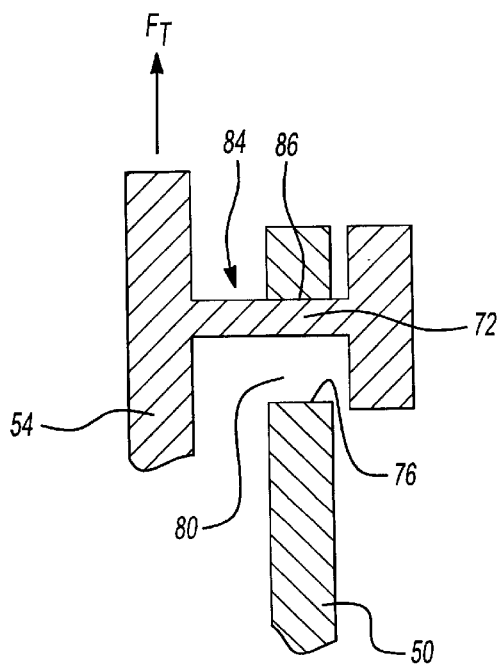
FIG. 3 is a cross-sectional side view, partially broken away, showing an overload stop.

As shown in FIG. 3, when a predetermined seatbelt input force is exceeded, i.e., the vehicle experiences a collision force, the second structural member 54 moves to a maximum limit to define an overload stop 84. In this position, the transversely extending member 72 engages an edge 86 of the opening 76 in the first structural member 50, preventing separation. When this position is reached the third member 56 is plastically deformed or fractured but the transversely extending portions 64, 72 prevent separation. Thus, overload protection is provided in addition to providing a thin member 56 to exhibit desired strain ranges for the sensor 58 under normal operating conditions.

Figure 4:
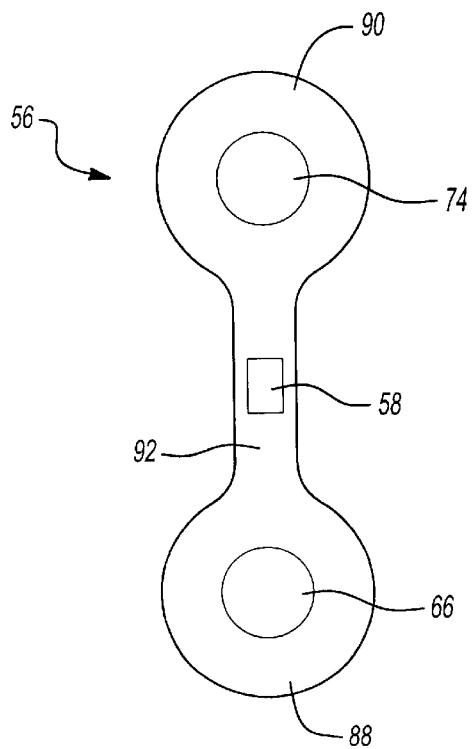
FIG. 4 is an overhead view of the subject sensor assembly.

The third member 56 is shown in greater detail in FIG. 4. The third member 56 includes a first mounting portion 88 that surrounds transversely extending portion 64 to define opening 66 and a second mounting portion 90 that surrounds transversely extending portion 72 to define opening 74. A narrow body portion 92 interconnects the first 88 and second 90 mounting portions. The sensor 58 is supported on this narrow body portion 92.

The sensor 58 measures the strain caused by the tension force $F_T$ in the seatbelt 22 to generate a belt force signal 42. The CPU 44 uses this signal 42 along with occupant weight information to identify the type of seat occupant and to ultimately control airbag deployment. An adult can experience a tension force in a seatbelt up to approximately 30 pounds (lbs) and still be comfortable. If the sensor 58 measures a tension force $F_T$ that exceeds 30 lbs then that would indicate that a child seat has been belted to the seat 12. Thus, the airbag 24 would not be deployed during a collision under these conditions. It should be understood that 30 lbs is an approximate value, which can vary due to differing seat and seatbelt configurations. Thus, the predetermined limit for comparison to the measured tension force $F_T$ can also vary depending upon the seat configuration.

As a result of isolating the sensor 58 from movements due to non-axial loading, more accurate belt force measurements can be taken. The subject invention accomplishes this by mounting a resilient thin member between a fixed structural member and a movable structural member. The fixed and movable structural members are interlocked to prevent separation and are configured to provide input to the resilient thin member. Thus, the subject sensor assembly 40 provides overload protection in addition to exhibiting desired strain ranges under normal operating conditions.

Although a preferred embodiment of this invention has been disclosed, it should be understood that a worker of ordinary skill in the art would recognize many modifications come within the scope of this invention. For that reason, the following claims should be studied to determine the true scope and content of this invention.

I claim:

1. A sensor assembly for measuring seatbelt forces comprising:
    a first member fixed relative to a vehicle structure;
    a second member mounted for movement relative to said first member in response to an input load from a seatbelt;
    a third member mounted between said first and second members wherein said first member includes a first transversely extending portion that extends through said second and third members and said second member includes a second transversely extending portion that extends through said first and third members; and
    a sensor mounted to said third member for measuring a seatbelt force resulting from said input load.

2. An assembly according to claim 1 wherein said first member includes a first opening for receiving said second transversely extending portion and said second member includes a second opening for receiving said first transversely extending portion wherein said first and second openings are of greater cross-sectional area than the cross-sectional area of said first and second transversely extending portions.

3. An assembly according to claim 2 wherein at least one of said first or second transversely extending portions engage an edge of one of said second or first openings, respectively, to define an overload stop to prevent separation of said first and second members.

4. An assembly according to claim 1 wherein a first gap is formed between said first transversely extending portion and said second member and a second gap is formed between said second transversely extending portion and said first member to define a maximum range of movement of said second member relative to said first member.

5. An assembly according to claim 4 wherein a third gap is formed between said first transversely extending portion and said third member and a fourth gap is formed between said second transversely extending member and said third member, said third and forth gaps being smaller than said first and second gaps.

6. A system for measuring seatbelt forces comprising:
    a vehicle seat for supporting an occupant;
    a seatbelt for securing the occupant to said vehicle seat; and
    a sensor assembly including a fixed member mounted to a vehicle structure, an input member operably connected to a seatbelt portion and mounted for movement relative to said fixed member, a floating member positioned between said fixed and input members and including a first end mounted for movement relative to said fixed member and a second end mounted for movement relative to said input member, and a sensor mounted to said floating member for measuring a seatbelt force resulting from an input load applied to said input member by said seatbelt wherein said floating member is formed from a resilient material that stretches in a linear direction parallel to said input load in response to movement of said input member.

7. A system according to claim 6 wherein said sensor includes at least one strain gage for measuring the strain of said floating member.

8. A system according to claim 7 including an overload stop to prevent said input member from separating from said fixed member when a predetermined input load is exceeded.

9. A system according to claim 8 wherein said fixed member includes a fixed post that extends through an input member opening and a first floating member opening and said input member includes a movable post that extends through a fixed member opening and a second floating member opening, said input and fixed member openings being greater in size than said first and second floating member openings.

10. A system according to claim 9 wherein engagement of said movable post against an edge of said fixed member opening defines said overload stop.

11. A system according to claim 6 wherein said first and second ends of said third member are positioned directly between said fixed and input members.

12. A system according to claim 6 wherein said floating member includes a narrow body portion that is narrower than said first and second ends and wherein said sensor is mounted to said narrow body portion.

13. A method for measuring a seatbelt force comprising the steps of:

fixing a first member to a vehicle structure;

mounting a second member for movement relative to said first member in response to a seatbelt input force;

positioning a third member including a sensor between the first and second members by mounting one end of the third member for movement relative to the first member and mounting an opposite end of the third member for movement relative to the second member;

stretching said third member in a generally linear direction parallel to the seatbelt input force; and measuring a force applied to the third member by the second member with the sensor to generate a seatbelt force signal.

14. A method according to claim 13 including the step of preventing separation of the second member from the first member when a predetermined seatbelt force limit is exceeded.

15. A method according to claim 14 including the step of plastically deforming or fracturing the third member prior to engaging an overload stop that prevents the first and second members from separating from each other when the predetermined seatbelt force limit is exceeded.

16. A method according to claim 13 including the steps of positioning the one end of the third member between the first member and the second member and positioning the opposite end of the third member between the first member and the second member.

17. A method according to claim 13 including the steps of forming the third member with a narrow body portion that is narrower than both ends of the third member and mounting the sensor to the narrow body portion.

18. A sensor assembly for measuring seatbelt forces comprising:

a first member fixed relative to a vehicle structure;

a second member mounted for movement relative to said first member in response to an input load from a seatbelt;

a third member positioned between said first and second members and having a floating attachment with a first end mounted to said first member for floating movement relative to said first member and a second end mounted to said second member for floating movement relative to said second member to define a home position and wherein said first end is held fixed relative to said first member and said second end moves with said second member in response to said input load to define a loaded position; and a sensor mounted to said third member for measuring a seatbelt force exerted by the seatbelt when said third member is in said loaded position.

19. An assembly according to claim 18 wherein said third member resiliently stretches in a direction generally parallel to said input load to generate high strain levels that are measured by said sensor when said third member is in said loaded position.

20. An assembly according to claim 19 wherein said third member plastically deforms or fractures when said input force exceeds a predetermined limit.

21. An assembly according to claim 20 including an overload stop to prevent said second member from separating from said first member when said predetermined limit is exceeded wherein said overload stop is only engaged subsequent to plastic deformation or fracture of said third member.

22. An assembly according to claim 19 wherein said third member includes a narrow body portion that is narrower than said first and second ends with said sensor being mounted to said narrow body portion.

23. An assembly according to claim 19 wherein both said first and second ends of said third member are positioned directly between said first and second members.

24. An assembly according to claim 23 wherein said first member includes a first transversely extending portion that extends first through said third member and then through said second member and wherein said second member includes a second transversely extending portion that extends through first through said third member and then through said first member.

* * * * *